Nov. 1, 1960 A. M. A. FREITAG 2,958,265
ARRANGEMENTS FOR MILLING THE BEARING SURFACES OF CARD FLATS
Filed June 19, 1956 2 Sheets-Sheet 1

INVENTOR:
AUGUSTE MATHIEU ALFRED FREITAG
By Richardson, David and Nordon
ATTYS.

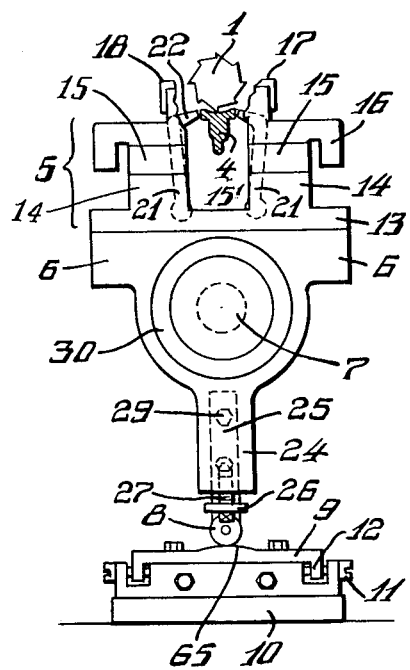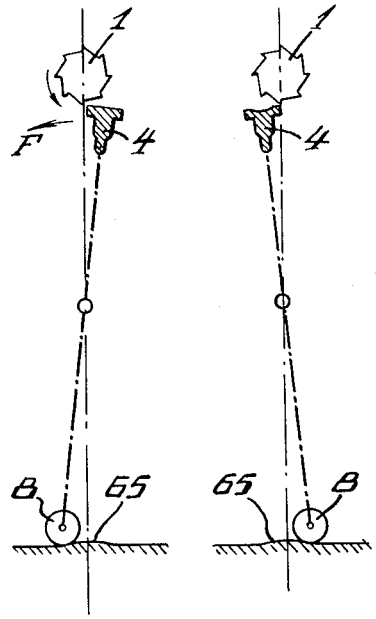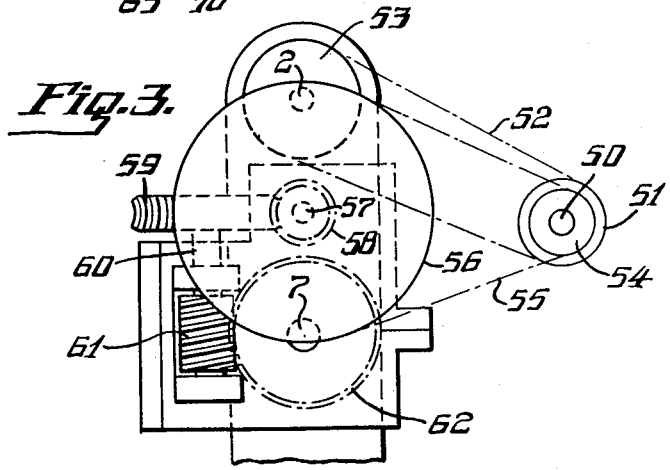

United States Patent Office 2,958,265
Patented Nov. 1, 1960

2,958,265

ARRANGEMENTS FOR MILLING THE BEARING SURFACES OF CARD FLATS

Auguste Mathieu Alfred Freitag, Lambermont, Belgium, assignor to De Spa & Fils, Societe en Commandite par Actions, Verviers, Belgium Filed June 19, 1956, Ser. No. 592,456

Claims priority, application Belgium June 24, 1955

3 Claims. (Cl. 90—20)

The present invention relates to an arrangement for milling the bearing surfaces of card flats.

In the arrangements used heretofore the flat is held in a clamp which forms part of a milling frame and the milling is accomplished by the displacement of the milling cutter which is moved horizontally by a handle and is moved vertically by an amount determined by a cam follower and cam.

The object of the present invention is to obtain greater precision in milling and, equally, a large regularity of results over a series of flats.

A further object is to very appreciably increase the speed of working while permitting very easy adjustability according to the type of flat.

To accomplish these objects the arrangement according to the invention is essentially characterized in that the milling tool has only a rotary movement about its axis without receiving a vertical or horizontal displacement and in that the flat to be milled is supported by a revolvable head which carries a follower adapted to contact a stationary cam, the flat being milled between two members (a milling tool and a cam) whose positions are a fixed distance apart.

In carrying the invention into effect the revolvable head is mounted on a shaft which can be driven and during the milling operation the head is displaced with respect to a fixed frame by a vertical sliding movement accompanied by the shaft itself and other parts of the machine, notably a gearbox containing gears which drive the shaft.

The cam is formed with a hump with which a follower on the rotatable head comes in contact and the follower is carried by a member whose position on the head can be adjusted.

In order to explain the invention and set out the other important characteristics of the invention, one example of means for carrying out the milling which is an object of the invention will be described with reference to the accompanying drawings in which:

Fig. 2 is an end elevation showing a rotatable head with a clamp integral with the head in which a card flat is held;

Fig. 3 is a detailed view of the drive for the rotation of the shaft of a milling cutter and the shaft of the rotatable head;

Figs. 4A and 4B are diagrammatic views illustrating the method of the milling.

Figure 1:
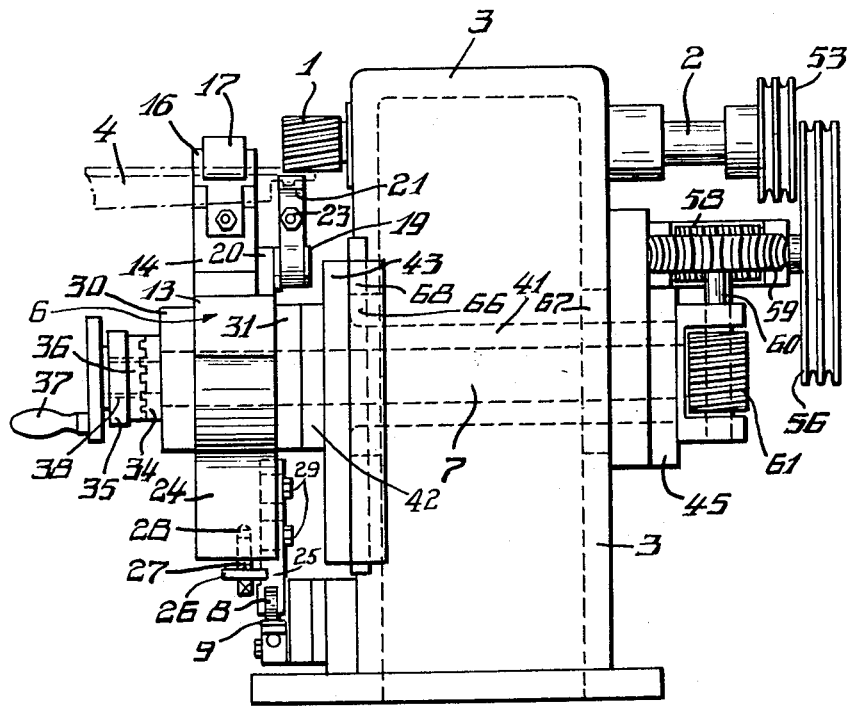
Fig. 1 is a side elevation of a milling assembly.

In the arrangement illustrated a milling cutter 1 is secured on a cutter shaft 2 and rotated in a fixed frame 3 by means which will be later described.

The cutter 1 receives a rotary movement only and is displaced neither vertically nor horizontally.

A flat 4 which is to be milled is held in a clamp 5 carried by a support 6 and the milling is carried out by revolving movement of the support about a head shaft 7.

The support 6 carries a follower 8 adjacent its lower end comprising a roller which contacts a cam 9 firmly held on a base 10 by screws or other means 11 which pass through edges 12 bent down from the cam 9.

In the example illustrated the clamp comprises a base 13 firmly secured to the support 6 by bolts and two blocks 14 between which is a gap 15¹.

Spacers 15 carried by the blocks 14 support members 16, joined by a bridge (not shown), in one of which a movable jaw 17 slides and co-operates with a fixed jaw 18; the jaws are so arranged that by the interaction of inclined faces and by tightening with a spanner, the frame carrying the card flat is positioned with its straight edge against the bridge.

Mounted on gudgeon pins 19, which are carried on a member 20 (Fig. 1) forming part of the assembly 6-13-14-15-16, are pivoted levers 21 provided at their upper ends with jaws 22 which are maintained in the position shown by a threaded bolt secured to one of the levers and held to the other by a nut 23.

The jaws 22 hold the part of the bearing surface of the flat to be trued.

The support 6 possesses the general shape shown in Fig. 1 and is elongated towards its lower end by a projection 24 in which an arm 25 is mounted to slide vertically, being limited by an adjustable disc 26 which is engaged by a notch in the arm and carried by a threaded rod 27 which is screwed or unscrewed in a threaded bore 28 in the projection 24. The arm 25 carries the cam follower 8 and may be secured by nuts 29 in alternative adjustable positions.

Towards the front and towards the rear the support 6 carries two collars 30, 31 and the assembly 6-30-31 is integral with a dog 34 which, with the assembly, is mounted to revolve freely and which forms part of a clutch mechanism comprising also another dog 35 and which is firmly mounted on a stud 36 which is an extension of the head shaft 7.

The dogs 34 and 35 may be disengaged by turning a handle 37, on account of a screw thread 38 provided in the dog 35.

The shaft 7 revolves in a bushing 41 rigidly mounted on one side of the support 6, a shoulder 42 making contact with the collar 31 and a sliding bushing 43 and on the other side with a reduction gear box 45.

A driving shaft 50 carries a pulley 51 (Figs. 1 and 3) which, by a belt 52, rotates a pulley 53 thus rotating the shaft 2 which carries the milling cutter 1.

The shaft 50 also carries a pulley 54 which, by a belt 55 rotates a pulley 56 keyed to a shaft 57 on which an endless thread 58 is formed and engages a worm 59 on a vertical shaft 60 provided with an endless thread 61 which engages a worm 62 to drive the shaft 7.

In brief the clamp 5 carrying the card flat 4, the support 6 and the follower 8 with the dog 34 can rotate round the shaft 7 and comprise a rotatable milling head.

This rotation can be effected manually when the dogs 34 and 35 are not engaged or driven through the shaft 7 when the dogs 34 and 35 are engaged.

The mechanical drive through the shaft 7 is used during the milling operation, i.e., while the flat is displaced angularly between the position shown in Fig. 4A and that shown in Fig. 4B.

During this angular displacement of the head, the follower 8 is raised by the hump 65 on the cam 9. This causes the whole head to be displaced upwardly and consequently the shaft 7 with its bushing 41 is lifted with respect to the frame 3 in a vertical sliding movement permitted by slots 66 and 67 provided in the frame (Fig. 1). This sliding movement of the shaft is accompanied by movement of the gearbox 45 as well as the collar 31 and the sliding bushing 43, which moves over a slider 68.

The milling operations of a card flat are as follows:

(a) Before milling, the flat is in the position shown in Fig. 4A.

(b) The clutch dogs 34 and 35 are engaged and the driving motor started, the shaft 7 is consequently rotated and this carries with it the milling head which turns with the flat 4 about the shaft 7 (in the direction of arrow F, Fig. 4A); at the same time the shaft 7 slides vertically in an accompanying movement whose amplitude is determined by the hump 65.

When the head has rotated to the position shown in Fig. 4B, the flat comes up against a stop (not shown) comprising a known microswitch which automatically stops the driving motor.

(c) The milled flat is removed and another, unmilled, flat is put in place.

(d) The dogs 34 and 35 are disengaged by the handle 37 so that the rotatable head is free from the shaft 7.

(e) The head is free to be rotated by hand about the shaft 7 in the direction opposite the arrow F so that the flat again takes up the position shown in Fig. 4A.

At this stage the dogs 34 and 35 are re-engaged and another flat can be milled.

The milling is thus accomplished by a revolving movement of the head combined with a sliding movement of the head and the shaft which rotates it.

The flat is thus milled between two members a fixed distance apart: the milling cutter 1 and the cam.

The milling is not subject to decreasing precision and very great regularity of work is attained over a series of flats.

Another advantage is that the work is substantially expedited and the speed may be increased more than fivefold.

Furthermore the machine can be adjusted very easily according to the type of flat to be milled, by raising the cam carrying arm 25 and on account of the interchangeability of the cams 9.

What I claim is:

1. Apparatus for the milling of the bearing surfaces of card flats comprising a frame having vertical slots on opposite sides therein, a horizontal cutter shaft rotatably mounted in the upper portion of said frame, a milling cutter mounted on one end of said cutter shaft, a support horizontally disposed for vertical movement in said slots, a work-holder fastened on an end of a rotatable shaft mounted in said support in vertically spaced relation to said cutter shaft, a clamp affixed to said work-holder at that end thereof adjacent to said cutter for holding a flat adjacent the underside of said cutter, a cam mounted on said frame below said work-holder, a follower dependently carried by said work-holder in contact with said cam, and means for simultaneously rotating said shafts whereby said cutter shaft is rotated relatively rapidly and said work-holder shaft is rotated relatively slowly while being raised and lowered by said cam.

2. An apparatus as defined in claim 1 wherein said work holder is substantially centrally affixed to said work holder shaft with said clamp and said follower positioned diametrically apart with respect to said work holder shaft.

3. An apparatus for the milling of the bearing surfaces of card flats comprising: a frame having vertical slots on opposite sides therein; a horizontal cutter shaft rotatably mounted in the upper portion of said frame; a milling cutter mounted on one end of said cutter shaft; a support horizontally disposed for slidable vertical movement in said slots; a work-holder coaxially mounted on one end of a rotatable shaft mounted in said support in vertically spaced relation to said cutter; a clamp affixed to said work-holder at that end thereof adjacent to said cutter for holding a flat adjacent the underside of said cutter; driving means operatively connected to said shafts for simultaneously rotating the same, whereby said cutter shaft is rotated relatively rapidly and said support shaft is rotated relatively slowly; a cam mounted on said frame below said work-holder; a follower slidably mounted in said frame on said support in slidable contact with said cam whereby the work-holder together with said support is given up and down movement by sliding in said vertical slots; a clutch by which said work-holder can be coupled with said support shaft, whereby said work holder rotates with a limited amplitude with the flat about the axis of the support shaft while it is proceeding by said cutter and said support shaft simultaneously slides vertically with the work-holder in said vertical slots through the cooperation of said cam and follower; electric stop means arranged in the rotary path of said work-holder so that when said work-holder makes contact therewith, it stops said driving means; said work-holder being adapted to be uncoupled from its driving shaft at the end of the milling operation and said flat being then removed and said work-holder being adapted to be then guided back into initial position for milling by being swung in the opposite direction to said position said work-holder is rotated by said driving means.

References Cited in the file of this patent

UNITED STATES PATENTS

| | | |
|---|---|---|
| 1,678,792 | Shaw | July 31, 1928 |
| 1,981,224 | DeVlieg | Nov. 20, 1934 |
| 2,773,432 | DeVlieg | Dec. 11, 1956 |
| 2,843,024 | Armitage et al. | July 15, 1958 |

FOREIGN PATENTS

| | | |
|---|---|---|
| 460,110 | Germany | May 23, 1928 |